(12) United States Patent
Miller (10) Patent No.: US 10,900,174 B2
(45) Date of Patent: *Jan. 26, 2021

(54) MODIFIED FIBER, METHODS, AND SYSTEMS

(71) Applicant: International Paper Company, Memphis, TN (US)

(72) Inventor: Charles E. Miller, Federal Way, WA (US)

(73) Assignee: International PaperCompany, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,654

(22) Filed: May 10, 2018

(65) Prior Publication Data

US 2018/0258589 A1 Sep. 13, 2018

Related U.S. Application Data (60) Continuation of application No. 15/253,450, filed on Aug. 31, 2016, now Pat. No. 9,995,000, which is a division of application No. 14/320,279, filed on Jun. 30, 2014, now Pat. No. 9,458,297.

(51) Int. Cl.
| | | |
|---|---|---|
| *D21H 11/20* | (2006.01) | |
| *C08J 3/24* | (2006.01) | |
| *B01J 19/24* | (2006.01) | |
| *D21C 9/00* | (2006.01) | |

(52) U.S. Cl.
CPC .......... *D21H 11/20* (2013.01); *B01J 19/2405* (2013.01); *C08J 3/24* (2013.01); *C08J 3/246* (2013.01); *D21C 9/00* (2013.01); *D21C 9/001* (2013.01); *D21C 9/002* (2013.01); *D21C 9/005* (2013.01); *B01J 2219/24* (2013.01); *C08J 2301/02* (2013.01); *C08J 2333/02* (2013.01); *C08J 2433/02* (2013.01)

(58) Field of Classification Search
CPC ...... C08J 3/24; C08J 2301/02; C08J 2333/02; B01J 19/2405; B01J 2219/24
See application file for complete search history.

(56) References Cited

U.S. PATENT DOCUMENTS

| | | |
|---|---|---|
| 3,224,926 A | 12/1965 | Bemardin |
| 3,241,533 A | 3/1966 | Balmer |
| 3,241,553 A | 3/1966 | Steiger |
| 3,440,135 A | 4/1969 | Chung |
| 3,526,048 A | 9/1970 | Rowland |
| 3,658,613 A | 4/1972 | Steiger |
| 3,664,795 A | 5/1972 | Heinz et al. |
| 3,756,923 A | 9/1973 | Dahms |
| 3,819,470 A | 6/1974 | Shaw |
| 3,932,209 A | 1/1976 | Chatterjee |
| 4,035,147 A | 7/1977 | Sangenis |
| 4,285,690 A | 8/1981 | North |
| 4,332,586 A | 6/1982 | North |
| 4,391,878 A | 7/1983 | Drach |
| 4,396,391 A | 8/1983 | North |
| 4,420,368 A | 12/1983 | Drach |
| 4,431,481 A | 2/1984 | Drach |
| 4,455,416 A | 6/1984 | Floyd |
| 4,505,712 A | 3/1985 | Floyd |
| 4,689,118 A | 8/1987 | Makoui |
| 4,820,307 A | 4/1989 | Welch |
| 4,822,453 A | 4/1989 | Dean |
| 4,853,086 A | 8/1989 | Graef |
| 4,888,093 A | 12/1989 | Dean |
| 4,889,595 A | 12/1989 | Herron |
| 4,889,596 A | 12/1989 | Schoggen-Howard |
| 4,889,597 A | 12/1989 | Bourbon |
| 4,898,642 A | 2/1990 | Moore |

(Continued)

FOREIGN PATENT DOCUMENTS

| | | |
|---|---|---|
| CN | 1052344 A | 6/1991 |
| CN | 1478164 A | 2/2004 |

(Continued)

OTHER PUBLICATIONS

Miller, B., and I. Tyomkin, "Liquid Porosimetry: New Methodology and Applications," The Journal of Colloid and Interface Science, 162(1)163-170, Jan. 1994.

(Continued)

*Primary Examiner* — Robert S Jones, Jr.
(74) *Attorney, Agent, or Firm* — Christensen O'Connor Johnson Kindness PLLC (57) ABSTRACT

Methods of forming crosslinked cellulose include mixing a crosslinking agent with an aqueous mixture of cellulose fibers containing little to no excess water (e.g., solids content of 25-55%), drying the resulting mixture to 85-100% solids, then curing the dried mixture to crosslink the cellulose fibers. Systems include a mixing unit to form, from an aqueous mixture of unbonded cellulose fibers having a solids content of about 25-55% and a crosslinking agent, a substantially homogenous mixture of non-crosslinked, unbonded cellulose fibers and crosslinking agent; a drying unit to dry the substantially homogenous mixture to a consistency of 85-100%; and a curing unit and to cure the crosslinking agent to form dried and cured crosslinked cellulose fibers. Intrafiber crosslinked cellulose pulp fibers produced by such methods and/or systems have a chemical on pulp level of about 2-14% and an AFAQ capacity of at least 12.0 g/g.

42 Claims, 5 Drawing Sheets

(56) References Cited

U.S. PATENT DOCUMENTS

| | | |
|---|---|---|
| 4,900,324 A | 2/1990 | Chance |
| 4,935,022 A | 6/1990 | Lash |
| 4,936,865 A | 6/1990 | Welch |
| 4,975,209 A | 12/1990 | Welch |
| 5,049,235 A | 9/1991 | Barcus |
| 5,137,537 A | 8/1992 | Herron |
| 5,160,789 A | 11/1992 | Barcus |
| 5,183,707 A | 2/1993 | Herron |
| 5,190,563 A | 3/1993 | Herron |
| 5,221,285 A | 6/1993 | Andrews |
| 5,225,047 A | 7/1993 | Graef |
| 5,247,072 A | 9/1993 | Ning et al. |
| 5,277,764 A * | 1/1994 | Johansson ............ D21H 17/29 162/175 |
| 5,366,591 A | 11/1994 | Jewell |
| 5,442,899 A | 8/1995 | Shibazaki |
| 5,447,977 A | 9/1995 | Hansen |
| 5,496,476 A | 3/1996 | Tang |
| 5,496,477 A | 3/1996 | Tang |
| 5,536,369 A | 7/1996 | Norlander |
| 5,549,791 A | 8/1996 | Herron |
| 5,556,976 A | 9/1996 | Jewell |
| 5,562,740 A | 10/1996 | Cook |
| 5,698,074 A | 12/1997 | Barcus |
| 5,705,475 A | 1/1998 | Tang |
| 5,728,771 A | 3/1998 | Tang |
| 5,843,061 A | 12/1998 | Chauvette |
| 5,873,979 A | 2/1999 | Naieni |
| 5,981,739 A | 11/1999 | Anderson |
| 5,998,511 A | 12/1999 | Westland |
| 6,300,259 B1 | 10/2001 | Westland |
| 6,306,251 B1 | 10/2001 | Jewell |
| 6,436,231 B1 | 8/2002 | Graef |
| 6,620,865 B2 | 7/2003 | Westland |
| 6,782,637 B2 | 8/2004 | Yancey et al. |
| 9,458,297 B2 * | 10/2016 | Miller ................ C08J 3/24 |
| 9,995,000 B2 * | 6/2018 | Miller ................ C08J 3/24 |
| 2002/0090511 A1 | 7/2002 | Smith et al. |
| 2003/0121623 A1 | 7/2003 | Westland et al. |
| 2003/0192659 A1 * | 10/2003 | Yancey .............. C04B 18/241 162/9 |
| 2003/0230391 A1 | 12/2003 | Hamed et al. |
| 2006/0142478 A1 | 6/2006 | Luo et al. |
| 2011/0077354 A1 | 3/2011 | Stoyanov et al. |
| 2011/0259536 A1 | 10/2011 | Flohr et al. |

FOREIGN PATENT DOCUMENTS

| | | |
|---|---|---|
| CN | 1810840 A | 8/2006 |
| CN | 102031694 A | 4/2011 |
| EP | 0570757 B1 | 9/2000 |
| EP | 2407133 A1 | 1/2012 |
| JP | 11-508327 A | 7/1999 |
| JP | 2010-168572 A | 8/2010 |
| JP | 2011-32630 A | 2/2011 |
| WO | 02/38860 A2 | 5/2002 |
| WO | 2002055774 A2 | 7/2002 |
| WO | 2002099183 A1 | 12/2002 |

OTHER PUBLICATIONS

Black Clawson Pulping Machines and Systems, Bulletin No. 62-SB, 1985, 12 pages.

International Preliminary Report on Patentability and Written Opinion dated Jan. 3, 2017, issued in corresponding International Application No. PCT/US15/37441, filed Jun. 24, 2015, 8 pages.

Communication and Supplementary European Search Report dated Dec. 21, 2017, issued in corresponding European Application No. 15 815 418.7, filed Jun. 24, 2015, 7 pages.

First Office Action dated Jan. 8, 2018, in Chinese Application No. 201580035420.6, filed Jun. 24, 2015, 18 pages.

Communication dated Feb. 11, 2019, issued in corresponding European Application No. 15 815 418.7, filed Jun. 24, 2015, 5 pages.

Japanese Office Action drafted Jul. 29, 2019, issued in Japanese Application No. 2016-567205, filed Jun. 24, 2015, 16 pages.

Office Action dated Dec. 19, 2019, issued in Indian Application No. 201617038105, filed Jun. 24, 2015, 6 pages.

Office Action dated Apr. 24, 2020, issued in Japanese Application No. 2016-567205, filed Jun. 24, 2015, 12 pages.

* cited by examiner

MODIFIED FIBER, METHODS, AND SYSTEMS

CROSS-REFERENCES TO RELATED APPLICATIONS

This application is a continuation of U.S. application Ser. No. 15/253,450, filed Aug. 31, 2016, which is a division of U.S. application Ser. No. 14/320,279, filed Jun. 30, 2014 (now U.S. Pat. No. 9,458,297), the entire disclosures of both of which are hereby incorporated by reference herein.

TECHNICAL FIELD

This disclosure relates to methods of and systems for forming modified fiber, in particular intrafiber crosslinked cellulose fiber.

BACKGROUND

Traditionally, cellulose fibers from southern pine and other softwood species are used in absorbent products in large part because the morphology of these fibers provides good absorbent performance. Compared to hardwood fibers, southern pine and other softwood fibers tend to be longer (e.g., having a length weighted fiber length of about 2.5 mm) and more coarse (e.g., having a coarseness greater than about 20 mg/100 m), and form low density pads with sufficient void volume to hold several times their weight in liquid. Hardwood fibers, on the other hand, are known for their performance in paper applications where shorter fiber length (e.g., about 1 mm) and lower coarseness (e.g., less than about 20 mg/100 m) provide a dense structure and smooth paper surface.

Crosslinked cellulose fibers are usually produced by applying a crosslinking agent to a dried sheet or roll of conventional softwood pulp fibers, generally at a dilute concentration to ensure chemical impregnation of the sheet, followed by wet fiberization in a hammermill to generate treated, individualized cellulose fibers. These fibers are then dried, such as in a flash drier, and cured, such as in an oven. The resulting fibers exhibit intrafiber crosslinking in which the cellulose molecules within a cellulose fiber are crosslinked. Intrafiber crosslinking generally imparts twist and curl to the cellulose fiber, and also imparts bulk to the fiber, properties that are advantageous in some absorbent products.

One drawback of this method is the high capital cost of the production process, as well as high energy costs due to drying the fiber prior to curing. Another drawback is that wet hammermilling can generate fiber and chemical buildup under usual mill conditions of heat and high airflow. Additionally, wet hammermilling produces undesirable features such as knots, which are unfiberized fiber clumps or pieces of the original pulp sheet. Generally, as production speeds increase, the level of knots also increases as the hammermilling efficiency is reduced.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments of methods of forming crosslinked cellulose products, as well as crosslinked cellulose products formed therefrom, are disclosed herein. The products may include, for example, individual crosslinked cellulose fibers, as well as mats, pads, sheets, webs, and the like generally made from individual crosslinked cellulose fibers.

In one aspect, the present disclosure provides methods of forming crosslinked cellulose products that include mixing a crosslinking agent with an aqueous mixture of unbonded cellulose fibers having a solids content and containing little to no excess water. The crosslinking agent is added in an amount suitable to effect a desired level of crosslinking in the cellulose fibers based on the solids content. In some methods, the mixing is performed at ambient conditions. In some methods, the crosslinking agent is added in an amount no more than that required to effect the desired level of crosslinking. The methods further include drying the resulting mixture to 85-100% solids, then curing the dried mixture to crosslink the cellulose fibers. In some methods, the solids content of the aqueous mixture is about 25-55%. Some methods include forming the aqueous mixture, such as by hydrapulping cellulose fibers from, for example, fibers provided in bale or roll form.

In one particular, non-limiting example of such a method, an aqueous mixture of unbonded cellulose fibers having a solids content of about 40-50% is formed, followed by mixing a polyacrylic acid crosslinking agent with the aqueous mixture in an amount to achieve a chemical on pulp level of about 2-14%, wherein said crosslinking agent is mixed at ambient conditions. The resulting mixture is then dried and cured as above.

In another aspect, the present disclosure provides embodiments of a system for forming crosslinked cellulose products, which include a mixer configured to form, from an aqueous mixture of unbonded cellulose fibers having a solids content of about 25-55% and a crosslinking agent, a substantially homogenous mixture of non-crosslinked, unbonded cellulose fibers and crosslinking agent, at ambient conditions. The system further includes, downstream of the mixer, a dryer configured to dry the substantially homogenous mixture to a consistency of 85-100% without curing the crosslinking agent; and a curing unit coupled to the dryer that is configured to cure the crosslinking agent, thereby forming dried and cured crosslinked cellulose fibers.

In another aspect, the present disclosure provides intrafiber crosslinked cellulose pulp fibers having a having a chemical on pulp level of about 2-14% and an AFAQ capacity of at least 12.0 g/g. In some embodiments, the cellulose fibers are, or include, hardwood cellulose pulp fibers, such as eucalyptus cellulose pulp fibers.

The concepts, features, methods, and component configurations briefly described above are clarified with reference to the accompanying drawings and detailed description below.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

According to one reference, U.S. Pat. No. 5,183,707 to Herron et al., there are three basic crosslinking processes. The first may be characterized as dry crosslinking, which is described, for example, in U.S. Pat. No. 3,224,926 to Bernardin. In a "dry crosslinking" process, individualized, crosslinked fibers are produced by impregnating swollen fibers in an aqueous solution with crosslinking agent, dewatering and defiberizing the fibers by mechanical action, and drying the fibers at elevated temperature to effect crosslinking while the fibers are in a substantially individual state. The fibers are inherently crosslinked in an unswollen, collapsed state as a result of being dehydrated prior to crosslinking. These processes produce what are referred to as "dry crosslinked" fibers. Dry crosslinked fibers are generally highly stiffened by crosslink bonds, and absorbent structures made therefrom exhibit relatively high wet and dry resilience. Dry crosslinked fibers are further characterized by low fluid retention values (FRV).

The second type, which is exemplified in U.S. Pat. No. 3,241,553 to Steiger, involves crosslinking the fibers in an aqueous solution that contains a crosslinking agent and a catalyst. Fibers produced in this manner are referred to as "aqueous solution crosslinked" fibers. Due to the swelling effect of water in cellulosic fibers, aqueous solution crosslinked fibers are crosslinked while in an uncollapsed, swollen state. Relative to dry crosslinked fibers, aqueous solution crosslinked fibers, for example as disclosed in the '553 patent, have greater flexibility and less stiffness, and are characterized by higher fluid retention value (FRV). Absorbent structures made from aqueous solution crosslinked fibers exhibit lower wet and dry resilience than structures made from dry crosslinked fibers.

In the third type, which is exemplified in U.S. Pat. No. 4,035,147 to Sangenis et al., individualized, crosslinked fibers are produced by contacting dehydrated, nonswollen fibers with crosslinking agent and catalyst in a substantially nonaqueous solution which contains an insufficient amount of water to cause the fibers to swell. Crosslinking occurs while the fibers are in this substantially nonaqueous solution. This process produces fibers referred to herein as "nonaqueous solution crosslinked" fibers. Such fibers do not swell even upon extended contact with solutions known to those skilled in the art as swelling reagents. Like dry crosslinked fibers, nonaqueous solution crosslinked fibers are highly stiffened by crosslink bonds, and absorbent structures made therefrom exhibit relatively high wet and dry resilience.

As explained in more detail herein, the present disclosure describes an additional, more viable and flexible approach, as compared to the three described by Herron.

In general, crosslinked cellulosic fibers can be prepared by applying a crosslinking agent(s) to cellulosic fibers in an amount sufficient to achieve intrafiber crosslinking under suitable conditions (e.g., temperature, pressure, etc.). Several examples of polyacrylic acid crosslinked cellulosic fibers and examples of methods for making polyacrylic acid crosslinked cellulosic fibers are described in U.S. Pat. Nos. 5,549,791, 5,998,511, and 6,306,251. A system and method that may be considered illustrative of the conventional approach to forming polyacrylic acid crosslinked cellulosic fibers is disclosed, for example, in U.S. Pat. Nos. 5,447,977 and 6,620,865. Accordingly, references to the "conventional approach" refer to the production of crosslinked cellulose fibers generally in accordance with that in the aforementioned patents, which follow the "dry crosslinking process" as described by Herron. Briefly, the system in these patents includes a conveying device for transporting a mat or web of cellulose fibers through a fiber treatment zone, an applicator for applying a crosslinking agent to the fibers at the fiber treatment zone, a fiberizer for separating the individual cellulose fibers comprising the mat to form a fiber output comprised of substantially unbroken and essentially singulated cellulose fibers, a dryer coupled to the fiberizer for flash evaporating residual moisture, and a controlled temperature zone for additional heating of fibers and an oven for curing the crosslinking agent, to form dried and cured individualized crosslinked fibers.

Although current commercial processes for producing crosslinked cellulose fiber products may use different reagents, reagent quantities, reaction and other process conditions, and so forth, than those disclosed in the aforementioned '977 and '865 patents, for the purposes of the present disclosure, references herein to the current commercial process generally refer to the conventional approach outlined in these patents.

Various aspects of the conventional approach are described in more detail in the following paragraphs. The term "mat" refers to a nonwoven sheet structure comprising cellulose fibers or other fibers that are not covalently bound together, but are mechanically entangled and/or bonded by hydrogen bonds. The fibers include fibers obtained from wood pulp or other sources including cotton rag, hemp, grasses, cane, cornstalks, cornhusks, or other suitable sources of cellulose fibers that may be laid into a sheet. The mat of cellulose fibers is generally in sheet form, and may be one of a number of baled sheets of discrete size, or may be a continuous roll.

Each mat of cellulose fibers is transported by a conveying device, which carries the mats through the fiber treatment zone, where a crosslinking agent solution is applied to the mat. The crosslinking agent solution is applied to one or both surfaces of the mat using methods including spraying, rolling, dipping, etc. After the crosslinking agent solution has been applied, the solution may be uniformly distributed through the mat, for example, by passing the mat through a pair of rollers.

The impregnated mat is then wet fiberized by feeding the mat through a hammermill. The hammermill disintegrates the mat into its component individual cellulose fibers, which are then air conveyed through a drying unit to remove the residual moisture.

The resulting treated pulp is then air conveyed through an additional heating zone (e.g. a dryer) to bring the temperature of the pulp to the cure temperature. In one variant, the dryer includes a first drying zone for receiving the fibers and removing residual moisture from the fibers via a flash-drying method, and a second heating zone for curing the crosslinking agent, to allow the chemical reaction (e.g., esterification, in some embodiments), to be completed. Alternatively, in another variant, the treated fibers are blown through a flash dryer to remove residual moisture, heated to a curing temperature, and then transferred to an oven where the treated fibers are subsequently cured. Overall, the treated fibers are dried and then cured for a sufficient time and at a sufficient temperature to achieve crosslinking.

As noted above, the conventional and historical approaches have some disadvantages. For example, in the conventional ("dry crosslinking") approach the crosslinking solution is generally very dilute (and correspondingly very low viscosity, generally lower than 5 cP) in order to better assure complete impregnation of the chemical into the pulp sheet. The conventional method involves adding excess chemical, also to better assure complete impregnation, which presents additional chemical handling concerns. In addition, wet fiberization, such as by a hammermill, leads to fiber and chemical buildup under usual mill conditions (sometimes referred to as contamination), which must be periodically removed, requiring production downtime. In addition, wet hammermilling tends to leave knots, with knot count generally increasing as production speeds increase, correspondingly decreasing hammermilling efficiency. Moreover, the conventional approach involves high energy costs due to wet hammermilling and water removal processes prior to curing the fiber. A downside to aqueous solution crosslinking is that a recycle/reclaim loop for excess water and chemical is needed and must be controlled.

Also, it has been found that the conventional approach is limited in terms of the types of cellulose fibers suitable for effective use with the dry crosslinking process, in which fiber mats are wetted with the aqueous crosslinking solution and then passed through rollers before being fed to a hammermill and fiberized. Accordingly, fibers that do not form mats of sufficient integrity to withstand mechanical manipulation when impregnated with a liquid tend to be much more difficult, if not impractical, to process efficiently on standard crosslinking equipment. As noted above, hardwood fibers are generally not used for absorbent products or in crosslinked cellulose fiber applications, because of their fiber morphology. In addition, however, some hardwood fibers, such as eucalyptus, form mats that fall apart easily when wet, and thus are not suitable fibers for use in the conventional approach.

As discussed in greater detail herein, systems and/or methods in accordance with the present disclosure may circumvent the aforementioned disadvantages, as well as providing an approach that can be used with a comparatively broader range of cellulose fibers. For example, mixing a crosslinking agent with an aqueous mixture of unbonded cellulose fibers that contains little to no excess water can reduce dryer load and avoid the contamination and knot content issues associated with wet hammermilling. It also may reduce or eliminate the need for a chemical recycle loop. Further, it has been found that high solids content aqueous fiber mixtures can be mixed with crosslinking agents of higher concentrations than are used in the conventional approach, for example in a high consistency mixer, and still achieve effective chemical distribution. This is unexpected, considering that materials having high solids contents have comparatively higher viscosities (e.g., 10-50 cP or higher), and it has traditionally been found to be difficult to achieve substantially homogenous mixtures with fiber when combining high viscosity materials, especially within practical processing times. In addition, mechanical manipulation of an impregnated mat is not a requirement, which may further reduce capital cost as well as present an option to crosslink cellulose fibers that have low wet tensile strength or structural integrity, such as those from hardwood species such as eucalyptus, or cellulose fibers that are not available in sheet or mat form. In addition, the methods of the present disclosure may be suitable for cellulose fibers from plant species other than hardwood or softwood trees, as well as cellulose that has been treated (such as mercerized fiber, and the like).

Mixtures of cellulose fibers and water, also referred to herein as "aqueous mixtures of cellulose fibers" (or, when it is clear that water is present, simply "fiber") exhibit different physical characteristics at different concentration ranges. One way to characterize the concentration ranges is by the manner in which water is retained by cellulose fibers. For example, cellulose fibers can bind a certain amount of water in pores within and on the surface of fibers, and in spaces between fibers. In general, water is more tightly bound in smaller pores (sometimes called micropores) than in larger pores (sometimes called macropores). Concentrations of such mixtures are conventionally expressed in terms of solids content, which refers, in this context, to the weight of the cellulose divided by the weight of the mixture of cellulose and water.

In general, mixtures that have solids content of up to about 15-25% exhibit fluid characteristics. A mixture in this solids content range is sometimes referred to as a slurry. Slurries can be drained of excess water—that is, water that is not held between fibers by surface tension forces or in fibrous pores—via gravitational forces and/or applied vacuum.

At or above a solids content of about 25%, little to no excess water remains, and the mixture is generally no longer flowable. Instead, mixtures at or above 25% solids content (and up to about 40-50%) often take the form of a moist, lumpy aggregate sometimes referred to as crumb. Although no more water will drain from such a mixture, free water— that is, water held between fibers and in large pores—may yet be removed by mechanical pressure, such as by standard dewatering equipment including screw presses, extruders, belt presses, roll presses, and so forth.

The cellulose fibers in the aforementioned slurry and crumb aqueous mixtures may be characterized as "unbonded"—that is, the fibers are not chemically bonded together, for example by covalent, hydrogen, or other types of chemical bonds, although there may be some mechanical entanglement.

At a solids content of about 55%, the remaining water is bound within the fibers, generally within micropores, and must be removed by evaporation in order to achieve higher solids content levels. This is generally done by standard drying equipment such as ovens, float dryers, drum dryers, flash dryers, and so forth. Evaporation of bound water is generally accompanied by collapse of the fibers and formation of hydrogen bonds, internal to, and/or between, fibers.

The threshold solids content levels that separate these three concentration ranges will vary to some extent among different types of cellulose fiber, due to fiber species, the manner in which the wood was pulped to generate the fibers, whether and to what extent the pulp is refined, and so forth.

Aqueous mixtures of cellulose fibers suitable for use in the present disclosure may be produced by any suitable method, such as by mixing cellulose, for example that is in roll or bale form, with water in a hydrapulper or a similar device, to a desired solids content. This process is sometimes referred to as slushing. Optionally, pulp in wet lap or other water-containing form (e.g., never-dried cellulose fibers) may be used, with water added or removed if necessary to achieve a desired solids content. In some methods, an aqueous mixture of a lower solids content is made and then dewatered to a desired solids content, such as by means of an extruder. In some methods, the aqueous mixture may be processed to remove or reduce fiber clumps, such as by feeding the mixture, once a desired solids content has been achieved, through one or more lump breakers, pin mills, or using other suitable means.

In methods in accordance with the present disclosure, the crosslinking agent is added to the cellulose mixture at a concentration at which there is little to no excess water—that is, at a solids content range of about 25-55%. In a manner somewhat similar to that in the conventional approach to crosslinking discussed above, the presence of excess water in the aqueous cellulose mixture when the crosslinking agent is added requires additional drying time, representing increased energy costs, and also may result in chemical buildup in the drying equipment, increasing the possibility of contamination and/or requiring downtime for removal. In addition, adding crosslinking agent to a mixture that contains excess water (such as a slurry) may result in inadvertent loss of some of the crosslinking agent in solution as it drains from the cellulose fibers, which can be difficult to monitor and may reduce process efficiency.

Also, it is theorized that excess water allows the fibers to swell and allows some crosslinking agents to fully penetrate the cell wall. This may interfere with fiber stiffness, a desired quality in crosslinked fibers. The concept of stiffening cellulose fiber is explained by the I-beam effect. Stiffer fibers are obtained when crosslinking is limited to the surface of the fibers. Chemical that penetrates into the cell wall is less efficient at generating stiffness. Providing an excess of chemical, due to low chemical solids (excess water), thus reduces chemical efficiency, as well as process efficiency by requiring a chemical recovery or recycle loop, and so forth.

Accordingly, in the methods disclosed herein, the crosslinking agent is added to the mixture of unbonded cellulose fibers and water at a solids content range of about 25-55%, which addresses many of the efficiency drawbacks noted above. In accordance with the desire to increase process efficiency by reducing dryer load, a more preferred range is about 35-55%. The capacity of current mixing equipment able to handle high-solids materials, such as high consistency mixers, tends to introduce some practical limitations, and accordingly a most preferred range is about 40-50%.

As used herein, the term "crosslinking agent" includes, but is not limited to, any one of a number of crosslinking agents and crosslinking catalysts. The following is a representative list of useful crosslinking agents and catalysts. Each of the patents noted below is expressly incorporated herein by reference in its entirety.

Suitable urea-based crosslinking agents include substituted ureas such as methylolated ureas, methylolated cyclic ureas, methylolated lower alkyl cyclic ureas, methylolated dihydroxy cyclic ureas, dihydroxy cyclic ureas, and lower alkyl substituted cyclic ureas. Specific urea-based crosslinking agents include dimethyldihydroxy urea (DMDHU, 1,3-dimethyl-4,5-dihydroxy-2-imidazolidinone), dimethyloldihydroxyethylene urea (DMDHEU, 1,3-dihydroxymethyl-4,5-dihydroxy-2-imidazolidinone), dimethylol urea (DMU, bis[N-hydroxymethyl]urea), dihydroxyethylene urea (DHEU, 4,5-dihydroxy-2-imidazolidinone), dimethylolethylene urea (DMEU, 1,3-dihydroxymethyl-2-imidazolidinone), and dimethyldihydroxyethylene urea (DDI, 4,5-dihydroxy-1,3-dimethyl-2-imidazolidinone).

Suitable crosslinking agents include dialdehydes such as C2-C8 dialdehydes (e.g., glyoxal), C2-C8 dialdehyde acid analogs having at least one aldehyde group, and oligomers of these aldehyde and dialdehyde acid analogs, as described in U.S. Pat. Nos. 4,822,453, 4,888,093, 4,889,595, 4,889,596, 4,889,597, and 4,898,642. Other suitable dialdehyde crosslinking agents include those described in U.S. Pat. Nos. 4,853,086, 4,900,324, and 5,843,061.

Other suitable crosslinking agents include aldehyde and urea-based formaldehyde addition products. See, for example, U.S. Pat. Nos. 3,224,926, 3,241,533, 3,932,209, 4,035,147, 3,756,913, 4,689,118, 4,822,453, 3,440,135, 4,935,022, 3,819,470, and 3,658,613.

Suitable crosslinking agents include glyoxal adducts of ureas, for example, U.S. Pat. No. 4,968,774, and glyoxal/cyclic urea adducts as described in U.S. Pat. Nos. 4,285,690, 4,332,586, 4,396,391, 4,455,416, and 4,505,712.

Other suitable crosslinking agents include carboxylic acid crosslinking agents such as polycarboxylic acids. Polycarboxylic acid crosslinking agents (e.g., citric acid, propane tricarboxylic acid, and butane tetracarboxylic acid) and catalysts are described in U.S. Pat. Nos. 3,526,048, 4,820,307, 4,936,865, 4,975,209, and 5,221,285. The use of C2-C9 polycarboxylic acids that contain at least three carboxyl groups (e.g., citric acid and oxydisuccinic acid) as crosslinking agents is described in U.S. Pat. Nos. 5,137,537, 5,183,707, 5,190,563, 5,562,740, and 5,873,979.

Polymeric polycarboxylic acids are also suitable crosslinking agents. Suitable polymeric polycarboxylic acid crosslinking agents are described in U.S. Pat. Nos. 4,391,878, 4,420,368, 4,431,481, 5,049,235, 5,160,789, 5,442,899, 5,698,074, 5,496,476, 5,496,477, 5,728,771, 5,705,475, and 5,981,739. Polyacrylic acid and related copolymers as crosslinking agents are described in U.S. Pat. Nos. 5,447,977, 5,549,791, 5,998,511, and 6,306,251. Polymaleic acid crosslinking agents are also described in U.S. Pat. No. 5,998,511.

Specific suitable polycarboxylic acid crosslinking agents include citric acid, tartaric acid, malic acid, succinic acid, glutaric acid, citraconic acid, itaconic acid, tartrate monosuccinic acid, maleic acid, polyacrylic acid, polymethacrylic acid, polymaleic acid, polymethylvinylether-co-maleate copolymer, polymethylvinylether-co-itaconate copolymer, copolymers of acrylic acid, and copolymers of maleic acid.

Other suitable crosslinking agents are described in U.S. Pat. Nos. 5,225,047, 5,366,591, 5,556,976, 5,536,369, 6,300,259, and 6,436,231.

Suitable catalysts can include acidic salts, such as ammonium chloride, ammonium sulfate, aluminum chloride, magnesium chloride, magnesium nitrate, and alkali metal salts of phosphorous-containing acids. In one embodiment, the crosslinking catalyst is sodium hypophosphite. Mixtures or blends of crosslinking agents and catalysts can also be used.

The crosslinking agent is added in an amount suitable to effect a desired level of crosslinking of the unbonded cellulose fibers based on the solids content. The determination of a desired level of crosslinking is often based on several considerations, such as a trade-off between increased fiber stiffness due to crosslinking and diminished capillary pressure, as well as material and energy costs, handling concerns, production rates, and so forth. The amount of crosslinking agent may be characterized as "chemical on pulp"

(or "COP"), which refers to a mass percent. Some methods in accordance with this disclosure include adding the crosslinking agent at a COP of about 2-14%, although other COP levels and/or ranges are within the scope of this disclosure. In accordance with principles of process efficiency, in some methods, the amount of crosslinking agent is no more than is required to achieve the desired level of crosslinking.

The concentration of the crosslinking agent is generally selected such that the addition of the agent to the aqueous mixture does not increase the water content of the resulting mixture beyond the desired range. For example, a typical concentration range for polymeric crosslinking agents is about 5-50%.

On the other hand, a premature decrease in the water content (that is, prior to drying) of the resulting mixture below the desired range may also have undesirable effects. With some crosslinking agents, water removal may result in the mixture becoming sticky and/or otherwise difficult to handle, resulting in slower processing. One example of this may be seen with polymeric crosslinking agents, in which a lack of water may initiate polymerization, causing the solids content of the mixture to increase and become sticky. Accordingly, in methods in accordance with the present disclosure, the crosslinking agent is added to the aqueous mixture at ambient conditions, defined herein as a set of conditions (e.g., temperature, pressure, air flow, time, etc.) under which water loss from the solution is minimized.

The crosslinking agent may be mixed with the aqueous mixture of unbonded cellulose fibers in any suitable manner, such as in a high consistency mixer, an extruder (or a region of an extruder, such as a section of an extruder downstream of a dewatering section), a refiner, and so forth. One advantage to the use of a high consistency mixer, in some embodiments, is that a high consistency mixer not only allows direct injection of the crosslinking chemistry into the mixture at solids contents of up to about 50%, but the mixer also may also fluff the fiber to prepare it for drying. Once mixed, the methods of the present disclosure include drying the mixture to about 85-100% solids, such as with standard drying apparatus (e.g., flash dryers, jet dryers, ring dryers, and so forth, or combinations thereof).

Curing refers to the initiation and ensuing chemical reaction that creates chemical bonds between the crosslinking agent and the cellulose. Crosslinking occurs by different chemical reactions, depending on the crosslinking agent. For example, polyacrylic and polycarboxylic acid crosslinking agents typically establish chemical crosslinks by means of an esterification reaction when reacted with cellulose. The present disclosure encompasses methods that proceed not only by esterification crosslinking reactions, but also by other crosslinking reactions, such as etherification and so forth, as well as the reaction conditions suitable for such reactions. Methods in accordance with the present disclosure proceed by curing the dried mixture under conditions effective to crosslink the unbonded cellulose fiber in the mixture. Curing may be accomplished by any suitable manner, such as those used in the conventional approach, etc.

Figure 1:
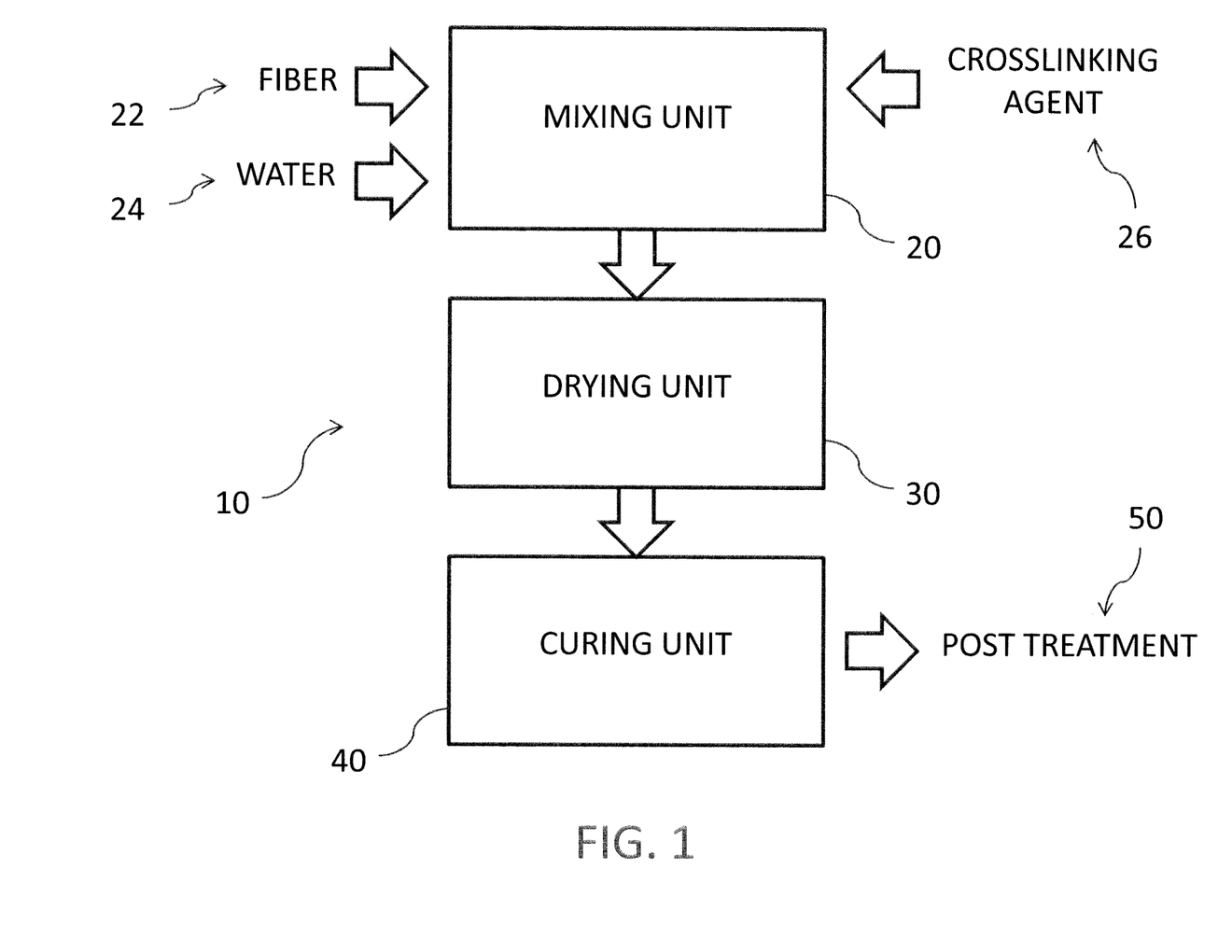
FIG. 1 is a schematic representation of an illustrative, non-limiting embodiment of a system suitable for producing crosslinked cellulose fibers in accordance with one aspect of the present disclosure.

With the illustrative methods discussed above in mind, including the various steps, concepts, and variants therein, FIG. 1 can be seen to be a schematic representation of an illustrative, non-limiting embodiment of a system, generally indicated at 10, that is suitable for producing crosslinked cellulosic compositions in accordance with aspects of the present disclosure.

System 10 is shown in FIG. 1 to include a series of boxes connected by arrows. As will be described, the boxes represent different functional regions, or units, of system 10. The boxes, as well as the term "unit," are used for convenience, as each functional unit may be a single component (such as a machine, piece of equipment, apparatus, and so forth), or part of a larger component that also incorporates one or more other functional units, or may represent multiple components that cooperate to perform the function(s) of the unit, and so forth. Various functional units and components of system 10 may be co-located, such as within a single facility (such as a mill), or located remotely from each other. The system 10 may be any suitable scale, from lab scale to industrial/commercial. The arrows generally represent the direction of the material or product produced or processed by the various functional units, and, accordingly, may also represent any suitable means of conveying the material from one unit to another (such as conduits, conveyors, etc.), and/or other pieces of processing or handling equipment.

System 10 is shown to include a mixing unit 20 that is configured to form, from an aqueous mixture of unbonded cellulose fibers having a solids content of about 25-55% and a crosslinking agent, a substantially homogenous mixture of non-crosslinked, unbonded cellulose fibers and crosslinking agent, at ambient conditions. As noted above, the mixing unit 20 may thus include, for example, a high consistency mixer or refiner to which an aqueous fiber mixture and crosslinking agent are added, as well as any necessary metering and/or delivery equipment for the mixture components. Accordingly, the fiber 22 and water 24 may be provided as a mixture, such as an aqueous mixture having the desired solids content, for example in embodiments in which the aqueous mixture is formed upstream of the mixing unit 20, and then mixed in mixing unit 20 with a crosslinking agent 26. As noted above, equipment (not shown) such as a hydrapulper, extruder, or other suitable equipment may produce the mixture. Prior to introduction to the mixing unit 20, such a mixture may be passed, for example, through one or more pieces of dewatering, processing, and/or handling equipment (not shown), such as one or more pin mills, screw presses, refiners, lump breakers, surge bins or hoppers, conveyors, and so forth.

Optionally, in some embodiments, the mixing unit 20 may incorporate such equipment, and be configured to accept the fiber 22 and water 24 as separate materials, such as to produce an aqueous mixture that is then mixed with crosslinking agent 26. In such embodiments, the mixing unit may be characterized as including a first zone (not separately shown) that is configured to form the aqueous mixture as described above, and a second zone (not separately shown) that is configured to receive both the aqueous mixture and the crosslinking agent and form the substantially homogenous mixture. As an example of such an embodiment, the first and second zones may be two subsequent regions of an extruder. In embodiments in which the aqueous mixture is produced, for example, at low solids content and then dewatered to the desired solids content for mixing with the crosslinking chemical, the mixing unit 20 may include a water recycle/reclaim loop, such as from a dewatering device to a hydrapulper.

The mixing unit is configured to mix the aqueous fiber mixture with the crosslinking agent, which as noted above may include one or more crosslinking chemicals and/or catalysts, as desired, under ambient conditions, that is, process conditions such as temperature, pressure, air flow, time, etc., under which water loss from the solution is minimized. The term "substantially homogenous," when used to describe the mixture of cellulose fibers, water, and crosslinking agent, indicates that the crosslinking agent is sufficiently well distributed among the fiber so as to form consistent and uniform crosslinks throughout each fiber when dried and cured. As noted above, the mixing unit, such as in embodiments in which the mixing unit includes a high consistency mixer, may also fluff the fiber (that is, impart an increase in bulk density) in the mixture. Optionally, the mixing unit may include other equipment to fluff the mixture prior to drying.

Downstream of mixing unit 20 is a drying unit 30 configured to receive the mixture from the mixing unit and dry the mixture to 85-100% solids. Accordingly, drying unit 30 may include one or more drying devices, such as one or more ovens, float dryers, drum dryers, flash dryers, jet dryers, and so forth. In some embodiments, the drying unit 30 may also bring the fibers up to or near to curing temperature.

Finally, the dried fibers are received by a curing unit 40 configured to cure the crosslinking agent, thereby forming dried and crosslinked cellulose fibers. The curing unit thus may incorporate additional drying devices, ovens, and so forth. In some embodiments, the drying unit and/or curing unit may incorporate a holding area, such as to allow the fibers to equilibrate at a set temperature and/or time, or such equilibration may occur as the fibers are conveyed from one functional unit to the next. Some embodiments may include a recycle/reclaim loop for air/heat from curing equipment to drying equipment.

Once formed, the crosslinked fibers exit the curing unit 40 and may be subjected to various post treatment processes, indicated generally at 50, such as to prepare the fibers for shipment or storage, for example by being baled according to standard methods, which may include remoisturizing followed by baling, and so forth.

Absorbent properties of crosslinked cellulosic compositions (such as wet bulk, wick time, wick rate, absorbent capacity, and so forth), may be determined using the Automatic Fiber Absorption Quality (AFAQ) Analyzer (Weyerhaeuser Co., Federal Way, Wash.). A standard testing procedure is described in the following paragraphs.

A 4-gram sample (conditioned at 50% RH and 73° F. (23° C.) for at least 4 hours) of the pulp composition is placed through a pinmill to open the pulp, and then airlaid into a tube. The tube is placed in the AFAQ Analyzer. A plunger then descends on the airlaid fluff pad at a pressure of 0.6 kPa. The pad height is measured, and the pad bulk (or volume occupied by the sample) is determined from the pad height. The weight is increased to achieve a pressure of 2.5 kPa and the bulk is recalculated. The result is two bulk measurements on the dry fluff pulp at two different pressures.

While under the plunger at the higher pressure, water is introduced into the bottom of the tube (to the bottom of the pad), and the time required for water to wick upward through the pad to reach the plunger is measured. From this, wick time and wick rate may be determined. The bulk of the wet pad at 2.5 kPa may also be calculated. The plunger is then withdrawn from the tube, and the wet pad is allowed to expand for 60 seconds. In general, the more resilient the sample, the more it will expand to reach its wet rest state. Once expanded, this resiliency is measured by reapplying the plunger to the wet pad at 0.6 kPa and determining the bulk. The final bulk of the wet pad at 0.6 kPa is considered to be the "wet bulk at 0.6 kPa" (in cm$^3$/g, indicating volume occupied by the wet pad, per weight of the wet pad, under the 0.6 kPa plunger load) of the pulp composition. Absorbent capacity (or "AFAQ capacity") may be calculated by weighing the wet pad after water is drained from the equipment, and is reported as grams water per gram dry pulp.

Maximum uptake ("MUP") of a fiber sample is also a capacity type value, but as measured under a different load. Capillary pressure measurements of a sample porous material are made on a TRI/Autoporosimeter (TRI/Princeton Inc. of Princeton, N.J.) to determine pore volumes and pore size distributions (see, e.g., EP2407133A1; see also *The Journal of Colloid and Interface Science*, Vol. 162, Issue 1 (January 1994), pp 163-170; the disclosures of both are incorporated herein by reference). As used in this application, determining the capillary pressure hysteresis curve of a material as function of saturation involves recording the increment of liquid that enters a porous material as the surrounding air pressure changes. A sample in the test chamber is exposed to precisely controlled changes in air pressure which at equilibrium (no more liquid uptake/release) correspond to the capillary pressure. The equipment operates by changing the test chamber air pressure in user-specified increments, either by decreasing pressure (increasing pore size) to absorb liquid, or increasing pressure (decreasing pore size) to drain liquid. The liquid volume absorbed (drained) is measured with a balance at each pressure increment.

A standard testing procedure is performed at 23° C.±2 C° (73° F.) and a relative humidity of 50%±5%. The test is run using a 0.9% saline solution. The surface tension (mN/m), contact angle (°), and density (g/cc) is determined by any method known in the art and provided to into the instrument's software (in this case the values used are 72, 0, and 1, respectively). The balance leveled at 156.7 g and equilibration rate set to 90 mg/min. The pore radius protocol (corresponding to capillary pressure steps) to scan capillary pressures, according to equation R=2y cos θ/Δp, is assigned, where: R is the pore radius, y is the surface tension, θ is the contact angle, and Δp is the capillary pressure. For example, a set of pore radius (R) steps for first absorption (pressure decreasing) are 25, 74, 98, 108, 120, 136, 156, 184, 245, 368, 735, 1470, 2940; and for desorption (pressure increasing) are 1470, 735, 490, 368, 147, 82, 65, 54, 47, 42, 25. A 0.5 g sample is cut into a 52 mm diameter circular specimen, then conditioned at 23° C.±2° C. (73° F.) and a relative humidity 50%±5% for minimum four (4) hours before testing. The weight is measured, to ±0.0001, and the specimen is placed at the center of the membrane (MF™ cellulose nitrate membrane filter type 8.0 micron SCWP available from Merck Millipore Ltd., Cork, Ireland). The desired load (0.2 psi or 1.38 kPa) is added onto the sample and the chamber is closed. After the instrument has applied the appropriate air pressure to the cell, the liquid valve to allow free movement of liquid to the balance is opened and the test under the radius protocol begins. The instrument proceeds through one absorption/desorption cycle. A blank (without sample specimen) is run in like fashion.

The mass uptake from a blank run is directly subtracted from the uptake of the sample at each target pore radius (pressure). The maximum uptake is the maximum value of liquid absorbed by the sample that corresponds to the lowest pressure. Saturation at each capillary pressure step is automatically calculated from liquid uptake as follows: $S = m^1/m^1_{max}$ where: S=saturation, $m^1$=liquid uptake at the pressure step (mL), and $m^1_{max}$=maximum liquid uptake (mL). Pressure is reported in cm of water and saturation in %. Data from the first absorption curve and the desorption curve are used. The liquid absorbed by the sample at 100% saturation is the maximum uptake. The maximum liquid uptake in mL provided by the instrument is divided by the liquid density to provide the liquid weight in grams. The maximum uptake in grams is divided by the dry sample weight in grams to obtain the reported value in g/g.

The aforementioned example embodiments are illustrative of any number of suitable application methods, as well as combinations thereof, all of which are understood to be encompassed by the present disclosure.

The following examples summarize representative, non-limiting embodiments and methods of forming crosslinked cellulose products in accordance with the methods and concepts discussed above, and are illustrative in nature. The reagent amounts, times, conditions, and other process conditions may be varied from those disclosed in the specific representative procedures disclosed in the following examples without departing from the scope of the present disclosure.

Example 1 (Lab Scale with PAA and Variable Fiber Solids Content)

Southern pine fiber (CF416, Weyerhaeuser NR Company) was slushed in a laboratory pulper in 1000 g (OD) batches and then dewatered in a laboratory centrifuge. The dewatered fiber was broken down into smaller fiber bundles using a laboratory pin mill. The solids content of the fiber was measured, and then the desired amount of fiber for the test was fed via conveyor into a hopper. A screw at the bottom of the hopper fed the fiber into a laboratory Sprout refiner fitted with traditional refining plates (C2976) in a vertical configuration, with the gap set to minimize any fiber cutting (generally 0.050"-0.300"). Crosslinking chemical (polyacrylic acid ("PAA") polymer) at 20% solids was applied via a chemical port located at the end of the screw immediately before the fiber enters the refiner. Fiber was delivered at a fixed rate. The chemical pump speed was changed to achieve the required chemical addition level. The treated fiber exited the refiner into a plastic beaker. The fiber was dried in a Fluid Energy 4" ThermaJet™ jet dryer with a target inlet temperature of 356° F. (180° C.). Dried fiber was equilibrated at room temperature before curing at 370° F. (187.8° C.) for 5 minutes.

Samples were compared to a commercial control (CMC530, available from Weyerhaeuser NR Company) prepared under the same chemical loading and curing conditions, but according to the conventional method. Representative samples and their corresponding AFAQ capacity results at constant COP are shown in Table 1 (Sample UC represents the untreated control, and Sample CC-PAA represents the commercial control using PAA). Table 1 indicates not only that effective crosslinking was achieved at high solids, but also that the AFAQ capacity of samples prepared according to the high solids methods of the present disclosure is unexpectedly greater as compared to samples prepared according to the conventional method.

TABLE 1

| Sample ID | Incoming Fiber Solids, % | AFAQ capacity (g/g) | Crosslinked? |
| --- | --- | --- | --- |
| Sample UC | n/a | 12.6 | No |
| Sample CC-PAA | n/a | 16.7 | Yes |
| Sample 1A | 35.0 | 18.7 | Yes |
| Sample 1B | 39.1 | 18.9 | Yes |
| Sample 1C | 41.6 | 18.9 | Yes |
| Sample 1D | 43.8 | 18.4 | Yes |
| Sample 1E | 43.9 | 18.6 | Yes |

Example 2 (Lab Scale with Citric Acid)

The process of Example 1 was followed using a 18% polycarboxylic acid (citric acid) solution as the crosslinking agent. Average solids content of the fiber was 43.3%. Curing conditions were 340° F. (171.1° C.) for 5 minutes. AFAQ capacity results for a representative sample are compared with a commercial control (CMC520, available from Weyerhaeuser NR Company) using the same citric acid crosslinking agent and with an untreated control in Table 2 (Sample CC-citric represents the commercial control using citric acid crosslinker). Again, the AFAQ capacity of Sample 2, prepared according to the high solids methods of the present disclosure, is unexpectedly greater as compared to the commercial control.

TABLE 2

| Sample ID | AFAQ capacity (g/g) | Crosslinked? |
| --- | --- | --- |
| Sample UC | 12.6 | No |
| Sample CC-citric | 14.7 | Yes |
| Sample 2 | 15.7 | Yes |

Example 3 (Lab Scale with Variable PAA Solids Content)

The process of Example 1 was conducted over an incoming solids content range of the polyacrylic acid crosslinking agent of 16.8-40% while keeping the incoming solids content of the fiber constant. For each sample, several levels of crosslinking agent were applied. To assess performance, the relationship between two capacity methods (maximum uptake, or "MUP," and AFAQ capacity) was compared. For all samples, the same relationship was observed to apply regardless of the beginning solution strength or crosslinking agent.

Figure 2:
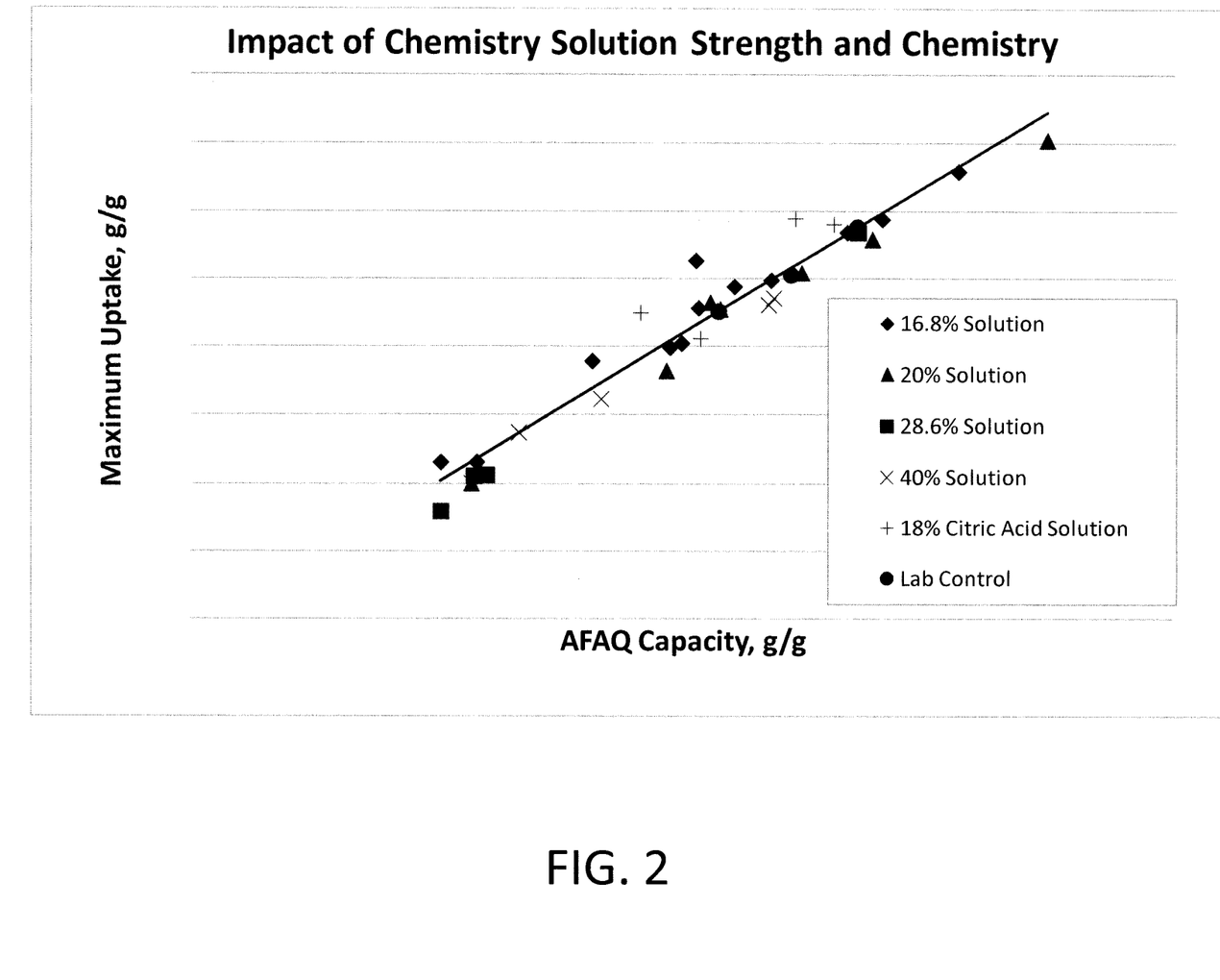
FIG. 2 is a graph representing a relationship between AFAQ capacity and MUP capacity at 0.3 psi (2.07 kPa) load of several samples of crosslinked cellulose fibers prepared by methods in accordance with the present disclosure.

FIG. 2 is a graph generally showing the correlation between AFAQ capacity (which increases from left to right on the x-axis) and MUP capacity at 0.3 psi (2.07 kPa) load (which increases from bottom to top on the y-axis) of several samples prepared as described in Example 3 (i.e., with PAA crosslinking agent, over a range of COP of about 2-14%), and also includes samples prepared as described in Example 2 (i.e., with 18% citric acid crosslinking agent, similar COP range), as well as lab controls.

Example 4 (Lab Scale with Alternative Process Configuration)

Southern pine fiber (CF416, Weyerhaeuser NR Company) was slushed in a laboratory pulper in 1000 g (OD) batches, then dewatered in a laboratory centrifuge. The dewatered fiber was broken down into smaller fiber bundles using a laboratory pin mill. The solids content of the fiber was measured to be 43.8%. This fiber was fed via conveyor into a hopper. A screw at the bottom of the hopper fed the fiber into a laboratory Sprout refiner fitted with "devil tooth" mixing plates (C2975A), with the gap was set to minimize any fiber cutting. PAA crosslinking chemical at 20% solids content was applied via a chemical port located at the end of the screw immediately before the fiber enters the refiner. Chemical was delivered at a fixed rate. The conveyor speed was changed to achieve the target fiber feed rate to provide the required chemical dosage. The treated fiber exited the refiner into a plastic bucket. The fiber was dried in a Fluid Energy Processing & Equipment Company 4" ThermaJet™ dryer with a target inlet temperature of 356° F. (180° C.). Dried fiber was equilibrated at room temperature before curing at 370° F. (187.8° C.) for 5 minutes.

The product was compared to a commercial control (CMC530) prepared under the same chemical loading and curing conditions. The results are shown in Table 3, in which Sample 4 represents the product and Sample 1D data is also included for comparison.

TABLE 3

| Sample ID | Incoming Fiber Solids, % | AFAQ capacity (g/g) | Crosslinked? |
|---|---|---|---|
| Sample UC | n/a | 12.6 | No |
| Sample CC-PAA | n/a | 16.7 | Yes |
| Sample 4 | 43.8 | 16.8 | Yes |
| Sample 1D | 43.8 | 18.4 | Yes |

Example 5 (Pilot Scale)

A pilot scale trial using a process in accordance with that of Example 1 was conducted. Southern pine fiber (CF416, Weyerhaeuser NR Company) was slushed in a pilot pulper (Black Clawson 300 gallon capacity) and then fed to a commercial screw press (Press Technology and Manufacturing Inc, Model 08L200) for dewatering. Fiber chunks from the screw press were broken apart by a rotary pin mill. The solids content of the fiber was measured to be 41.6%. The fiber was placed into a volumetric feeder with a 6" screw. Metered fiber was dropped onto a conveyer that deposited the fiber into the inlet of an high consistency ("HC") mixer (manufactured by Andritz) using C2975A mixer plates in a horizontal configuration with the gap was set to minimize any fiber cutting. Crosslinking chemical (22.3% PAA solution) was pumped into the inlet of the mixer via an injection port. The chemical feed rate was adjusted to provide the required chemical addition level. The treated fiber exited the commercial mixer into a drum, and then dried in a Fluid Energy Processing & Equipment Company 4" ThermaJet™ dryer. Dried fiber was equilibrated at room temperature before curing at 380° F. (193.3° C.) for 8 minutes. Performance of the pilot scale trial matched the lab results at the same target chemical loading and curing conditions, as shown in Table 4.

TABLE 4

| Sample ID | Incoming Fiber Solids, % | AFAQ capacity (g/g) | Crosslinked? |
|---|---|---|---|
| Sample 5 (pilot) | 41.6 | 17.7 | Yes |
| Sample 5 (lab) | 41.6 | 17.4 | Yes |

Example 6 (Lab Scale with Variable COP)

Figure 3:
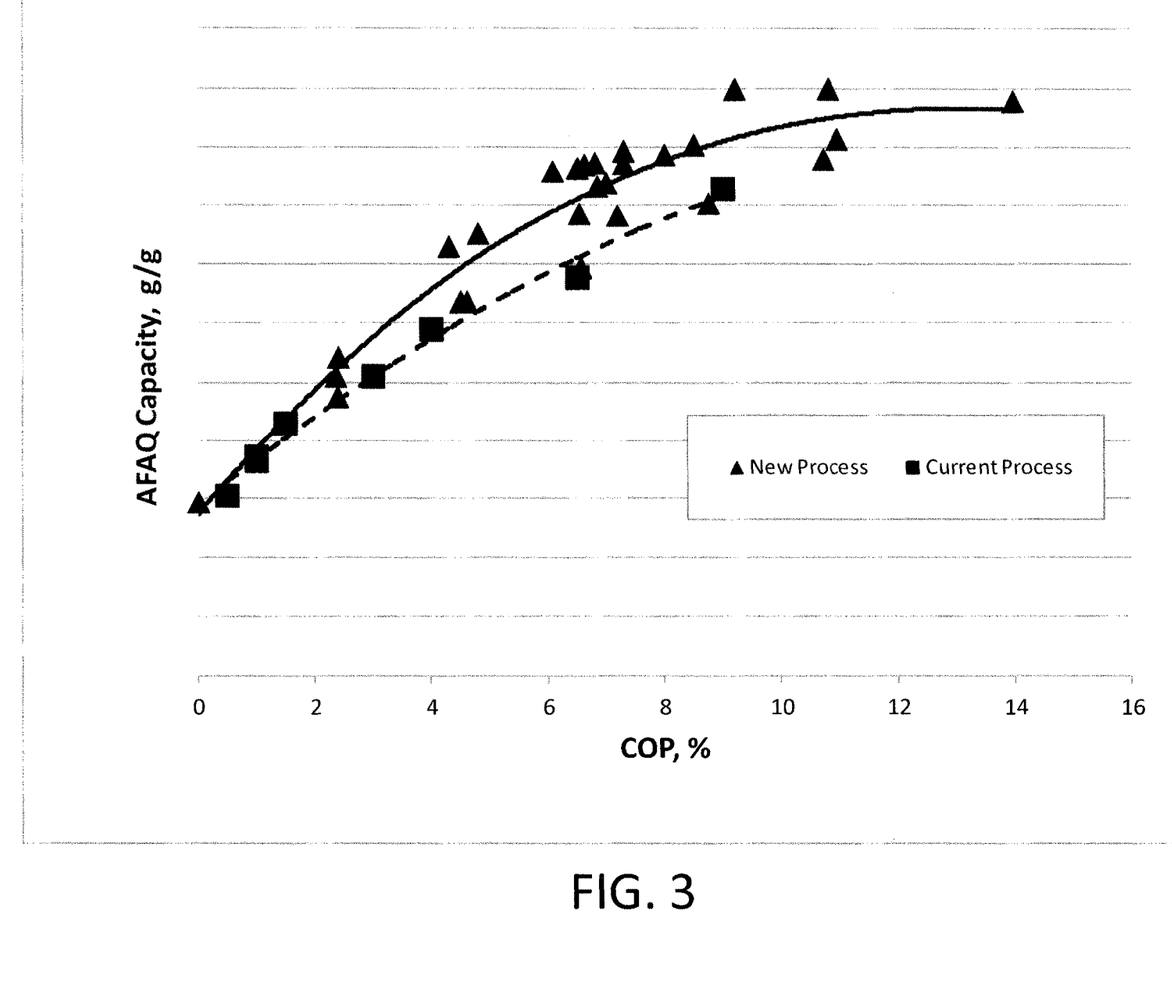
FIG. 3 is a graph representing a relationship between AFAQ capacity and COP of crosslinking agent for representative samples prepared with a 20% polyacrylic acid crosslinking agent according to one aspect of the present disclosure, compared with samples prepared according to the conventional approach.

The process of Example 1 was conducted over a range of crosslinking chemical addition levels, using 20% PAA. As shown in FIG. 3, AFAQ capacity for such fibers over a range of about 2-14% was found to be improved over crosslinked cellulose fibers produced according to the commercial method under similar conditions (of reagent amounts, times, and so forth). Samples prepared according to Example 1 are indicated as "new process" data points, whereas the commercial method prepared samples are indicated as "current process" data points.

Figure 4:
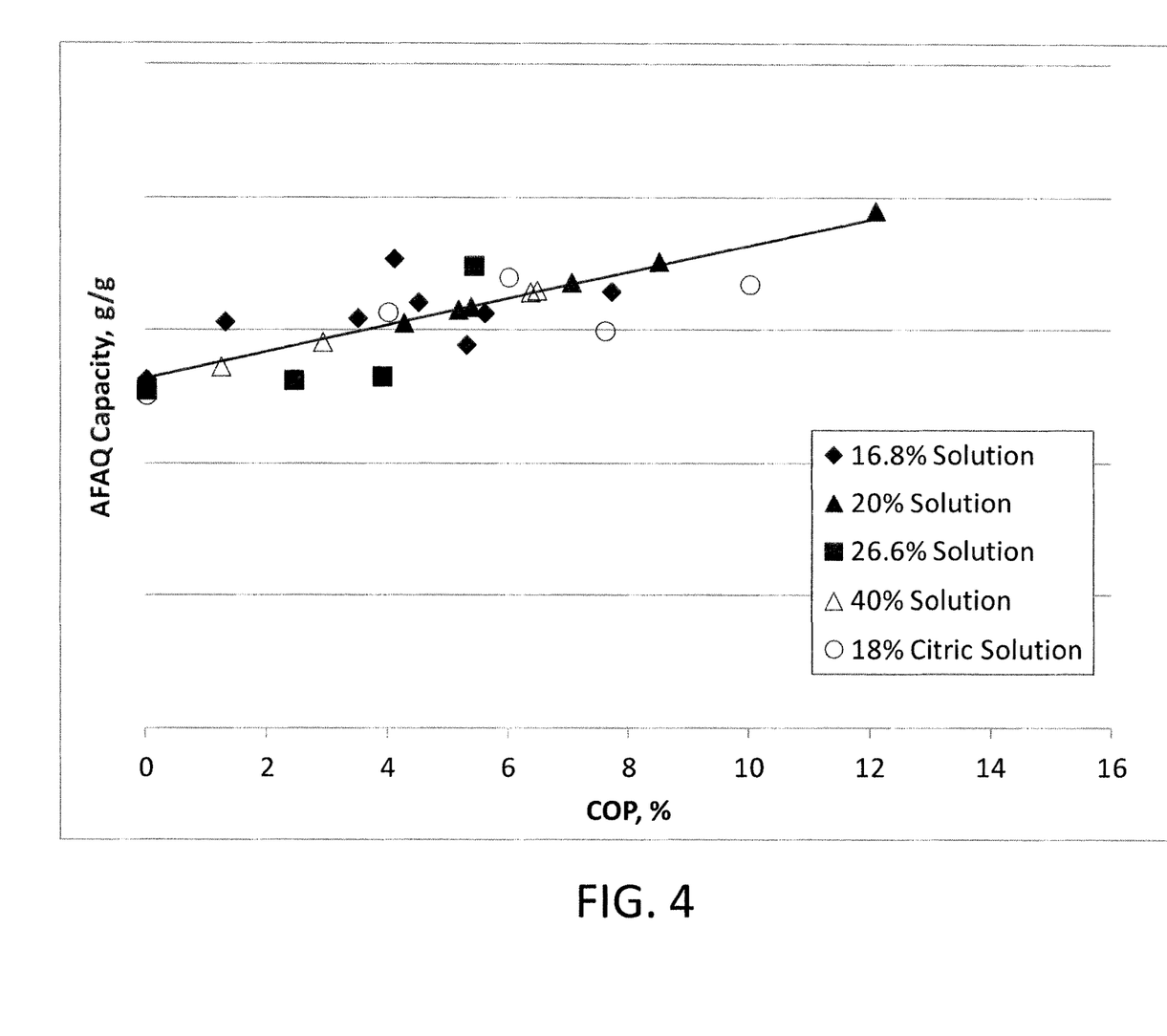
FIG. 4 is a graph representing a relationship between AFAQ capacity and COP of crosslinking agent for representative samples prepared with a variety of crosslinking agents according to one aspect of the present disclosure.

FIG. 4 shows the general trend of AFAQ capacity (which increases from bottom to top on the y-axis) to increase as COP increases over the range tested, with both PAA crosslinking agents (over a range of solids content of the crosslinking agent) and citric acid crosslinking agent.

Example 7a (Alternative Pulps)

Never-dried Douglas fir wet lap, obtained from Weyerhaeuser, was slushed, dewatered, processed, mixed with PAA at 20%, and dried and cured in accordance with the process of Example 6. Because the conventional process uses once-dried pulp sheets, a sample following the conventional process was not prepared with wet lap (which is never-dried pulp). Results (representative sample shown in Table 5) showed favorable AFAQ capacity of crosslinked fibers formed from wet lap.

TABLE 5

| Sample ID | Incoming Fiber Solids, % | AFAQ capacity (g/g) | Crosslinked? |
|---|---|---|---|
| Sample 7-FIR | 37.7 | 17.0 | Yes |

Example 7b (Alternative Pulps)

*Eucalyptus* pulp (Bleached *Eucalyptus* Kraft Pulp available from Fibria Veracel mill, Brazil) was processed in accordance with the process of Example 4. Representative samples (Sample 7-EUC represents eucalyptus, and Sample UC-EUC represents untreated eucalyptus) are shown in Table 6. For comparison, Table 6 also includes data for a commercial control (CMC530, indicated as Sample CC-PAA), and a lab control prepared from CF416 and crosslinked according to the same method at the same COP as Sample 7-EUC (indicated as Sample LC-PAA).

TABLE 6

| Sample ID | Incoming Fiber Solids (%) | AFAQ capacity (g/g) | Crosslinked? |
|---|---|---|---|
| Sample CC-PAA | n/a | 16.7 | Yes |
| Sample LC-PAA | 41.8 | 16.8 | Yes |
| Sample UC-EUC | n/a | 12.0 | Yes |
| Sample 7-EUC | 41.2 | 17.4 | Yes |

Table 6 indicates not only that effective crosslinking was achieved with eucalyptus pulp, but also that the AFAQ capacity thereof exceeds that of conventionally produced southern pine crosslink.

Figure 5:
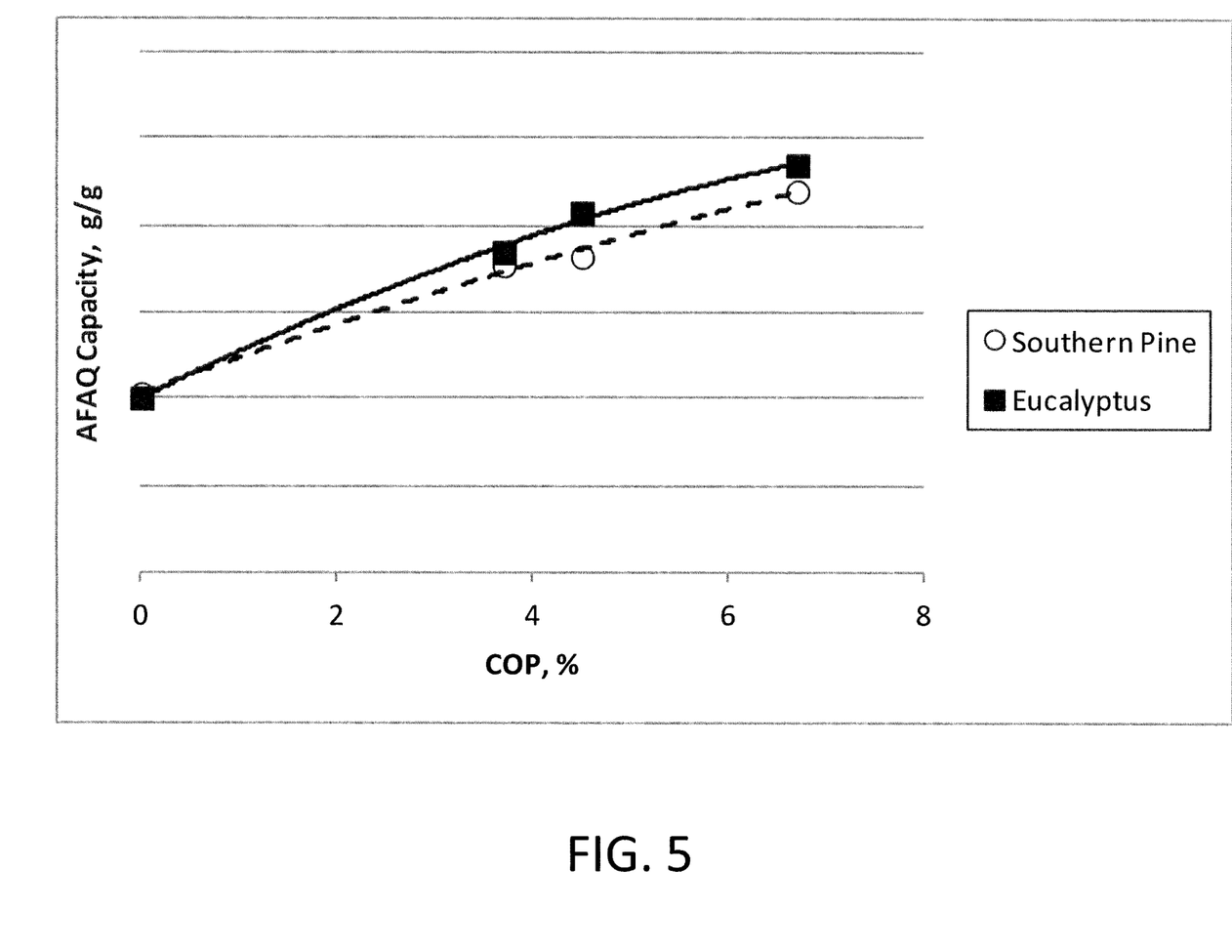
FIG. 5 is a graph representing a relationship between AFAQ capacity and COP of crosslinking agent for representative eucalyptus samples prepared according to one aspect of the present disclosure, compared with southern pine samples prepared according to the conventional approach.

Several samples were prepared, varying the COP levels for the eucalyptus fibers. FIG. 5 is a graph showing that the AFAQ capacity of eucalyptus fibers crosslinked according to methods of the present disclosure (indicated as "Eucalyptus" in FIG. 5) were superior to that of southern pine kraft pulp produced according to the conventional crosslink method (indicated as "Southern Pine" in FIG. 5) over a sample COP range.

Although the present invention has been shown and described with reference to the foregoing operational principles and illustrated examples and embodiments, it will be apparent to those skilled in the art that various changes in form and detail may be made without departing from the spirit and scope of the invention. The present invention is intended to embrace all such alternatives, modifications and variances that fall within the scope of the appended claims.

The embodiments of the invention in which an exclusive property or privilege is claimed are defined as follows:

1. A crosslinked cellulose product comprising individual intrafiber crosslinked cellulose pulp fibers having a chemical on pulp level of about 2-14% and an automatic fiber absorption quality ("AFAQ") capacity of at least 12.0 g/g.

2. The crosslinked cellulose product of claim 1, wherein the intrafiber crosslinked cellulose pulp fibers include softwood cellulose pulp fibers.

3. The crosslinked cellulose product of claim 1, wherein the intrafiber crosslinked cellulose pulp fibers are treated cellulose pulp fibers.

4. The crosslinked cellulose product of claim 1, wherein the intrafiber crosslinked cellulose pulp fibers are hardwood cellulose pulp fibers.

5. The crosslinked cellulose product of claim 4, wherein the hardwood cellulose pulp fibers are eucalyptus pulp fibers.

6. The crosslinked cellulose product of claim 1, wherein the intrafiber crosslinked cellulose pulp fibers are intrafiber crosslinked with one or more of a polyacrylic acid and a polycarboxylic acid crosslinking agent.

7. The crosslinked cellulose product of claim 1, wherein the intrafiber crosslinked cellulose pulp fibers have an AFAQ capacity of at least 16.0 g/g.

8. A cellulose mat comprising intrafiber crosslinked cellulose pulp fibers having a chemical on pulp level of about 2-14% and an automatic fiber absorption quality ("AFAQ") capacity of at least 12.0 g/g.

9. The cellulose mat of claim 8, wherein the intrafiber crosslinked cellulose pulp fibers include softwood cellulose pulp fibers.

10. The cellulose mat of claim 8, wherein the intrafiber crosslinked cellulose pulp fibers are treated cellulose pulp fibers.

11. The cellulose mat of claim 8, wherein the intrafiber crosslinked cellulose pulp fibers are hardwood cellulose pulp fibers.

12. The cellulose mat of claim 11, wherein the hardwood cellulose pulp fibers are eucalyptus pulp fibers.

13. The cellulose mat of claim 8, wherein the intrafiber crosslinked cellulose pulp fibers are intrafiber crosslinked with one or more of a polyacrylic acid and a polycarboxylic acid crosslinking agent.

14. The cellulose mat of claim 8, wherein the intrafiber crosslinked cellulose pulp fibers have an AFAQ capacity of at least 16.0 g/g.

15. A cellulose pad comprising intrafiber crosslinked cellulose pulp fibers having a chemical on pulp level of about 2-14% and an automatic fiber absorption quality ("AFAQ") capacity of at least 12.0 g/g.

16. The cellulose pad of claim 15, wherein the intrafiber crosslinked cellulose pulp fibers include softwood cellulose pulp fibers.

17. The cellulose pad of claim 15, wherein the intrafiber crosslinked cellulose pulp fibers are treated cellulose pulp fibers.

18. The cellulose pad of claim 15, wherein the intrafiber crosslinked cellulose pulp fibers are hardwood cellulose pulp fibers.

19. The cellulose pad of claim 18, wherein the hardwood cellulose pulp fibers are eucalyptus pulp fibers.

20. The cellulose pad of claim 15, wherein the intrafiber crosslinked cellulose pulp fibers are intrafiber crosslinked with one or more of a polyacrylic acid and a polycarboxylic acid crosslinking agent.

21. The cellulose pad of claim 15, wherein the intrafiber crosslinked cellulose pulp fibers have an AFAQ capacity of at least 16.0 g/g.

22. A cellulose sheet comprising intrafiber crosslinked cellulose pulp fibers having a chemical on pulp level of about 2-14% and an automatic fiber absorption quality ("AFAQ") capacity of at least 12.0 g/g.

23. The cellulose sheet of claim 22, wherein the intrafiber crosslinked cellulose pulp fibers include softwood cellulose pulp fibers.

24. The cellulose sheet of claim 22, wherein the intrafiber crosslinked cellulose pulp fibers are treated cellulose pulp fibers.

25. The cellulose sheet of claim 22, wherein the intrafiber crosslinked cellulose pulp fibers are hardwood cellulose pulp fibers.

26. The cellulose sheet of claim 25, wherein the hardwood cellulose pulp fibers are eucalyptus pulp fibers.

27. The cellulose sheet of claim 22, wherein the intrafiber crosslinked cellulose pulp fibers are intrafiber crosslinked with one or more of a polyacrylic acid and a polycarboxylic acid crosslinking agent.

28. The cellulose sheet of claim 22, wherein the intrafiber crosslinked cellulose pulp fibers have an AFAQ capacity of at least 16.0 g/g.

29. A cellulose web comprising intrafiber crosslinked cellulose pulp fibers having a chemical on pulp level of about 2-14% and an automatic fiber absorption quality ("AFAQ") capacity of at least 12.0 g/g.

30. The cellulose web of claim 29, wherein the intrafiber crosslinked cellulose pulp fibers include softwood cellulose pulp fibers.

31. The cellulose web of claim 29, wherein the intrafiber crosslinked cellulose pulp fibers are treated cellulose pulp fibers.

32. The cellulose web of claim 29, wherein the intrafiber crosslinked cellulose pulp fibers are hardwood cellulose pulp fibers.

33. The cellulose web of claim 32, wherein the hardwood cellulose pulp fibers are eucalyptus pulp fibers.

34. The cellulose web of claim 29, wherein the intrafiber crosslinked cellulose pulp fibers are intrafiber crosslinked with a one or more of a polyacrylic acid and a polycarboxylic acid crosslinking agent.

35. The cellulose web of claim 29, wherein the intrafiber crosslinked cellulose pulp fibers have an AFAQ capacity of at least 16.0 g/g.

36. A cellulose composition comprising intrafiber crosslinked cellulose pulp fibers having a chemical on pulp level of about 2-14% and an automatic fiber absorption quality ("AFAQ") capacity of at least 12.0 g/g.

37. The cellulose composition of claim 36, wherein the intrafiber crosslinked cellulose pulp fibers include softwood cellulose pulp fibers.

38. The cellulose composition of claim 36, wherein the intrafiber crosslinked cellulose pulp fibers are treated cellulose pulp fibers.

39. The cellulose composition of claim 36, wherein the intrafiber crosslinked cellulose pulp fibers are hardwood cellulose pulp fibers.

40. The cellulose composition of claim 39, wherein the hardwood cellulose pulp fibers are eucalyptus pulp fibers.

41. The cellulose composition of claim 36, wherein the intrafiber crosslinked cellulose pulp fibers are intrafiber crosslinked with one or more of a polyacrylic acid and a polycarboxylic acid crosslinking agent.

42. The cellulose composition of claim 36, wherein the intrafiber crosslinked cellulose pulp fibers have an AFAQ capacity of at least 16.0 g/g.

* * * * *

UNITED STATES PATENT AND TRADEMARK OFFICE
CERTIFICATE OF CORRECTION

| | | |
|---|---|---|
| PATENT NO. | : 10,900,174 B2 | Page 1 of 1 |
| APPLICATION NO. | : 15/976654 | |
| DATED | : January 26, 2021 | |
| INVENTOR(S) | : C. Miller | |

It is certified that error appears in the above-identified patent and that said Letters Patent is hereby corrected as shown below:

On the Title Page

Item (73) Assignee      Please change "PaperCompany" to -- Paper Company --.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*